(12) United States Patent
Terzini

(10) Patent No.: US 8,734,061 B2
(45) Date of Patent: May 27, 2014

(54) CONTAINER TRANSPORT DECELERATOR

(75) Inventor: Robert Terzini, Corinth, TX (US)

(73) Assignee: Tension International, Inc., Kansas City, MO (US)

( * ) Notice: Subject to any disclaimer, the term of this patent is extended or adjusted under 35 U.S.C. 154(b) by 590 days.

(21) Appl. No.: 13/059,975

(22) PCT Filed: Aug. 21, 2009

(86) PCT No.: PCT/US2009/054671
§ 371 (c)(1),
(2), (4) Date: Feb. 19, 2011

(87) PCT Pub. No.: WO2010/022361
PCT Pub. Date: Feb. 25, 2010

(65) Prior Publication Data
US 2011/0150580 A1    Jun. 23, 2011

Related U.S. Application Data

(60) Provisional application No. 61/090,900, filed on Aug. 22, 2008.

(51) Int. Cl.
*B65G 51/20*    (2006.01)
(52) U.S. Cl.
USPC ............... 406/83; 406/82; 406/157; 406/163
(58) Field of Classification Search
USPC ..................... 406/82, 83, 157, 163
See application file for complete search history.

(56) References Cited

U.S. PATENT DOCUMENTS

| | | | | |
|---|---|---|---|---|
| 1,613,565 A | * | 1/1927 | MaClaren | 406/1 |
| 2,845,661 A | * | 8/1958 | Svende et al. | 406/82 |
| 3,332,724 A | * | 7/1967 | Doucet | 406/82 |
| 3,995,910 A | * | 12/1976 | Atwell | 406/82 |
| 5,647,697 A | * | 7/1997 | Gigante et al. | 406/83 |
| 8,479,475 B2 | * | 7/2013 | Van Steen | 53/111 RC |
| 2009/0218363 A1 | * | 9/2009 | Terzini | 221/4 |
| 2011/0142554 A1 | * | 6/2011 | Terzini | 406/189 |
| 2012/0228083 A1 | * | 9/2012 | Terzini | 198/345.1 |
| 2013/0167974 A1 | * | 7/2013 | Ronchi | 141/34 |

* cited by examiner

*Primary Examiner* — Joseph Dillon, Jr.
(74) *Attorney, Agent, or Firm* — Polsinelli PC

(57) ABSTRACT

Cylindrical prescription containers are propelled through a pneumatic transport system at high speeds by low pressure, high-velocity air. Upon arrival at destination stations within the transport system, curvilinear decelerators slow them by directing them through a plurality of curved paths where they dissipate momentum. Once slowed, the containers are deposited upon a moving conveyor to be staged into the next processing station at an even pace. The decelerators comprise curved vanes surrounding the container path, the vanes being held in a fixed, curvilinear relation to each other and the container by a series of yokes surrounding and engaging the vanes. The conveyor is driven by a servo motor controllable by the transport system to pace containers as needed by the next processing station.

16 Claims, 15 Drawing Sheets

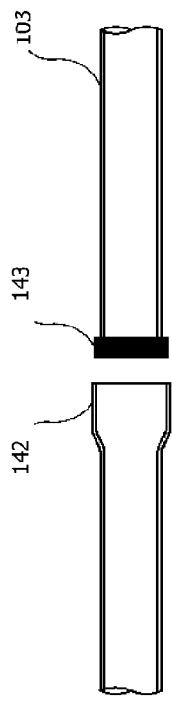
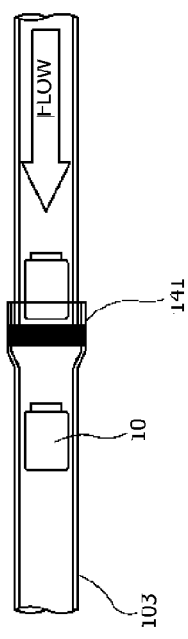
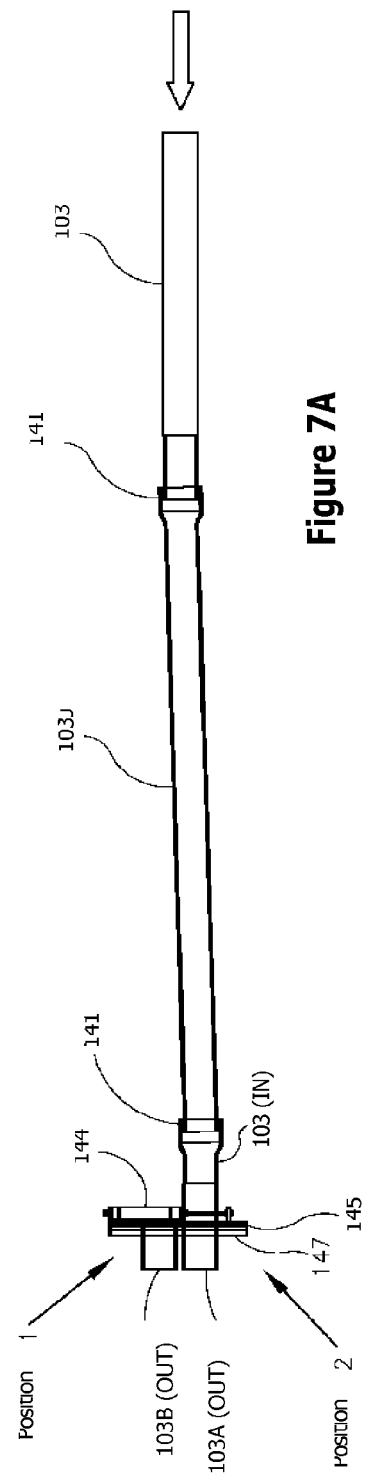

CONTAINER TRANSPORT DECELERATOR

CROSS-REFERENCE TO RELATED APPLICATIONS

This application claims priority under 35 U.S.C. 371 as a national stage entry from PCT/US09/54671 entitled CONTAINER TRANSPORT DECELERATOR filed Aug. 21, 2009 and this application claims the benefit of priority from U.S. Provisional Application, Ser. No. 61/090,900 for PNEUMATIC CONTAINER TRANSPORT SYSTEM filed Aug. 22, 2008, the entireties of which applications are incorporated herein by reference.

BACKGROUND OF THE INVENTION

1. Field of the Invention

This invention relates generally to automated small object packaging distribution systems and particularly to container transport systems for use in filling containers for such systems. More particularly, this invention relates to apparatus operable for gently decelerating containers as they approach a container processing station within such container transport systems.

2. Description of Related Art

NOTE: hereinafter, the present invention is discussed in the context of a preferred embodiment for automated pharmaceutical prescription-filling systems, but one having ordinary skill in the art will recognize that the present invention, along with the principles and practices thereof, may be utilized for filling containers of any small objects, and that all such small object container filling applications are considered to be within the spirit and scope of the present invention.

Automated pharmaceutical prescription-filling systems answer a need for high-volume pharmaceutical deliveries. The initial purpose of such systems was to reduce relatively high rates of medication errors associated with manual prescription filling, and to create means for increased volume needed for modern times. Side benefits have been lower costs, reduction of personnel, inventory control, substance control, automated documentation, quick turn-around times and relief to professional pharmacists from the tedium of monitoring a multitude of high-volume orders. The use of central fill mail order service to fill prescriptions has been highly successful in lowering the costs of providing drugs to consumers.

Most semi-automated systems remain relatively labor intensive. Dispensing machines which automatically count tablets or capsules often still require manual intervention to complete an order. For example a pharmacist or technician may have to position a patient's prescription container under the correct pill dispensing chute, or further handle it manually before shipping. The advantages of a system which automatically fills prescriptions, combines multiple prescriptions for a single patient and prepares the order for mailing are readily apparent.

A number of issues must be resolved to automatically fill and combine multiple prescription orders into a single package. In automated prescription filling systems, bottle handling requires means for transporting the bottles while tracking their exact location and status within the process. Many automated prescription filling systems move the bottles around between stations using carriages, or trays commonly known as "pucks" or "totes." The trays prevent the bottles from becoming jammed, tipped over or damaged in transit. Trays with multiple bottle positions ("totes") require that all bottles in them pass through the system together, thus preventing separate directivity for each bottle. Further, such trays are heavy and must be returned from the end of the system back to its beginning to be used again. Individual bottle carriers or trays ("pucks") alleviate this grouping problem but still involve a separate device to contain the bottles which must be moved around the system independently using conventional conveyors and pushers, and once emptied, returned to beginning loading points for re-use. A need exists for a system which does not rely on pucks and totes to shepherd such containers through an automated prescription filling system.

Automated prescription filling systems which dispense with pucks and totes encounter another obstacle, the problem of damage and abrasion of the contents of the bottles as they move through the system by themselves. An empty bottle can move very fast under the influence of a propulsion system, and it can stop abruptly, spin and otherwise move about without concern for the condition of its contents. A bottle filled with pharmaceuticals, however, must be handled gently enough that its contents do not abrade against themselves and do not suffer jolts and abrupt stops which may break or otherwise damage the pharmaceuticals. Means is needed for a bottle propulsion system which handles containers, particularly filled containers, without causing damage product or other contents.

SUMMARY OF THE INVENTION

Cylindrical prescription containers are propelled through a pneumatic transport system at high speeds by low pressure, high-velocity air. Upon arrival at destination stations within the transport system, curvilinear decelerators slow them by directing them through a plurality of curved paths where they dissipate momentum. Once slowed, the containers are deposited upon a moving conveyor to be staged into the next processing station at an even pace. The decelerators comprise curved vanes surrounding the container path, the vanes being held in a fixed, curvilinear relation to each other and the container by a series of yokes surrounding and engaging the vanes. The conveyor is driven by a servo motor controllable by the transport system to pace containers as needed by the next processing station.

BRIEF DESCRIPTION OF THE DRAWINGS

The novel features believed characteristic of the present invention may be set forth in appended claims. The invention itself, however, as well as a preferred mode of use and further objects and advantages thereof, will best be understood by reference to the following detailed description of an illustrative embodiment when read in conjunction with the accompanying drawings, wherein:

FIGS. 7A-7F and 8A-8D detail two-way and three-way tubing diverter valves employed in the bottle transport system of FIG. 1. FIG. 7F shows the detail of FIG. 7B horizontally exploded better to view its components.

FIGS. 11A-12B detail two types of bottle decelerators employed by the bottle transport system of FIG. 1.

DESCRIPTION OF A PREFERRED EMBODIMENT

Figure 1:
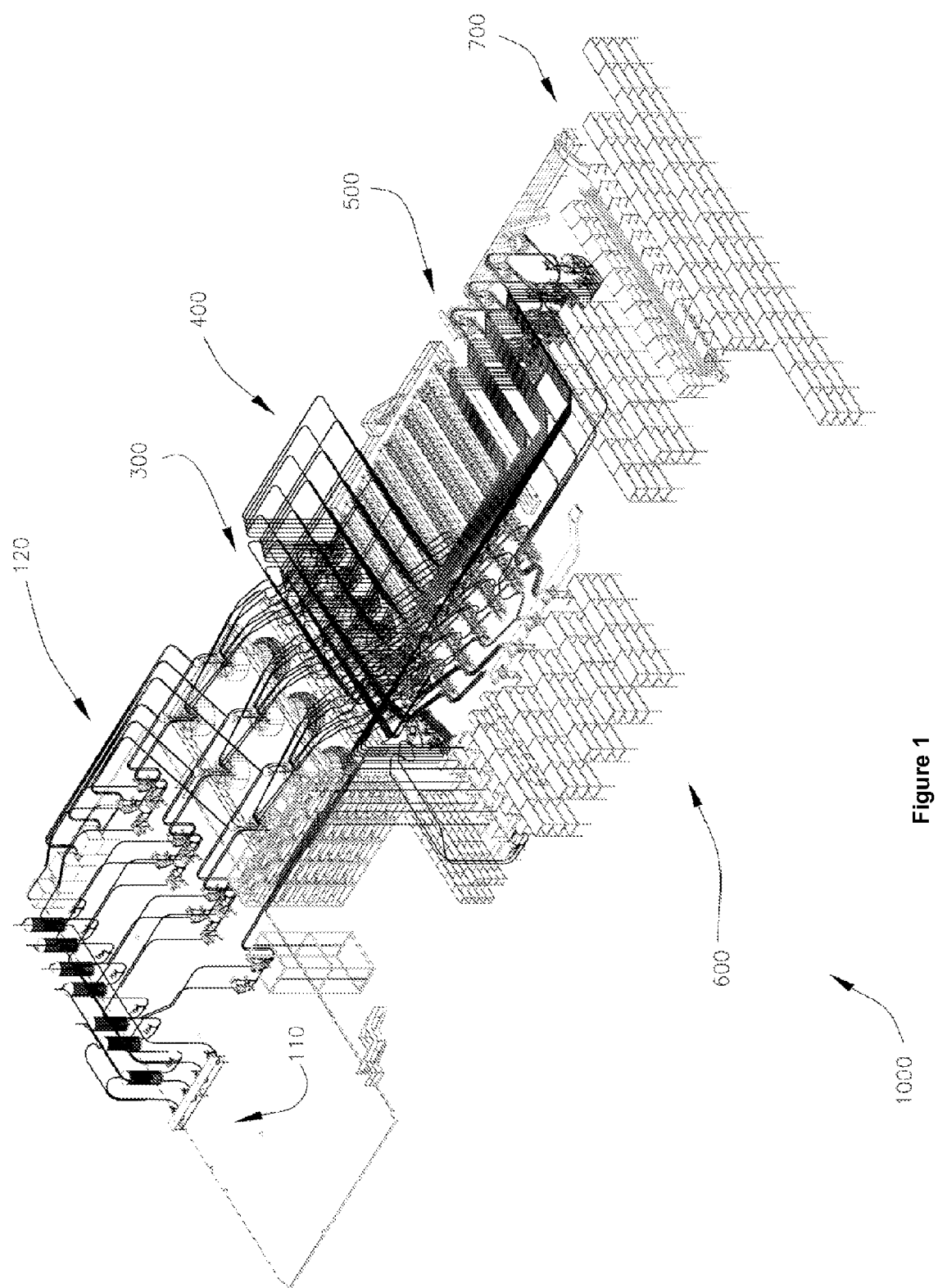
FIG. 1 shows in quartering perspective view an automated prescription filling system utilizing the pneumatic bottle transport system of the present invention.
Figure 2:
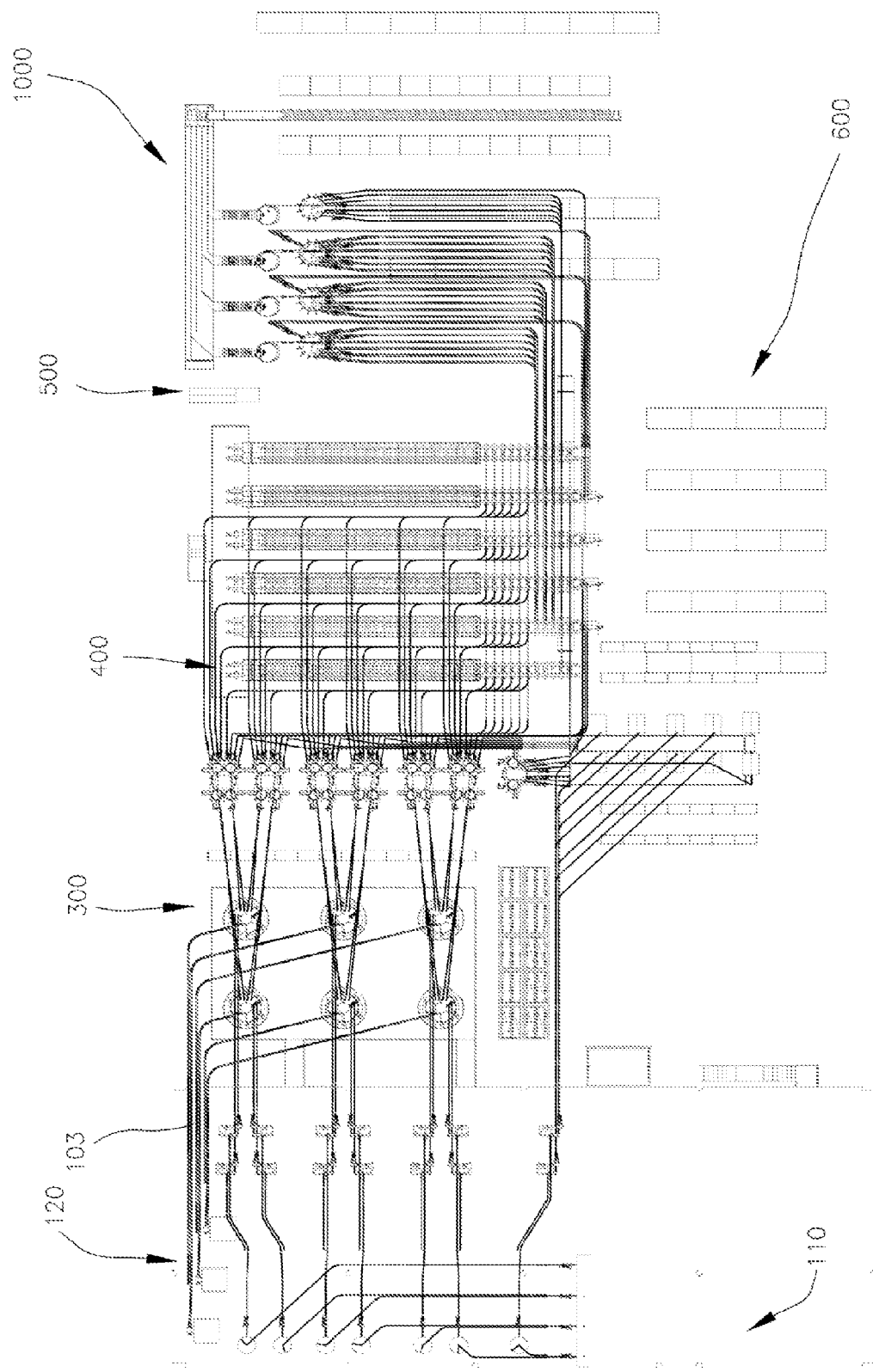
FIG. 2 depicts the automated prescription filling system of FIG. 1 in top plan view.
Figure 3:
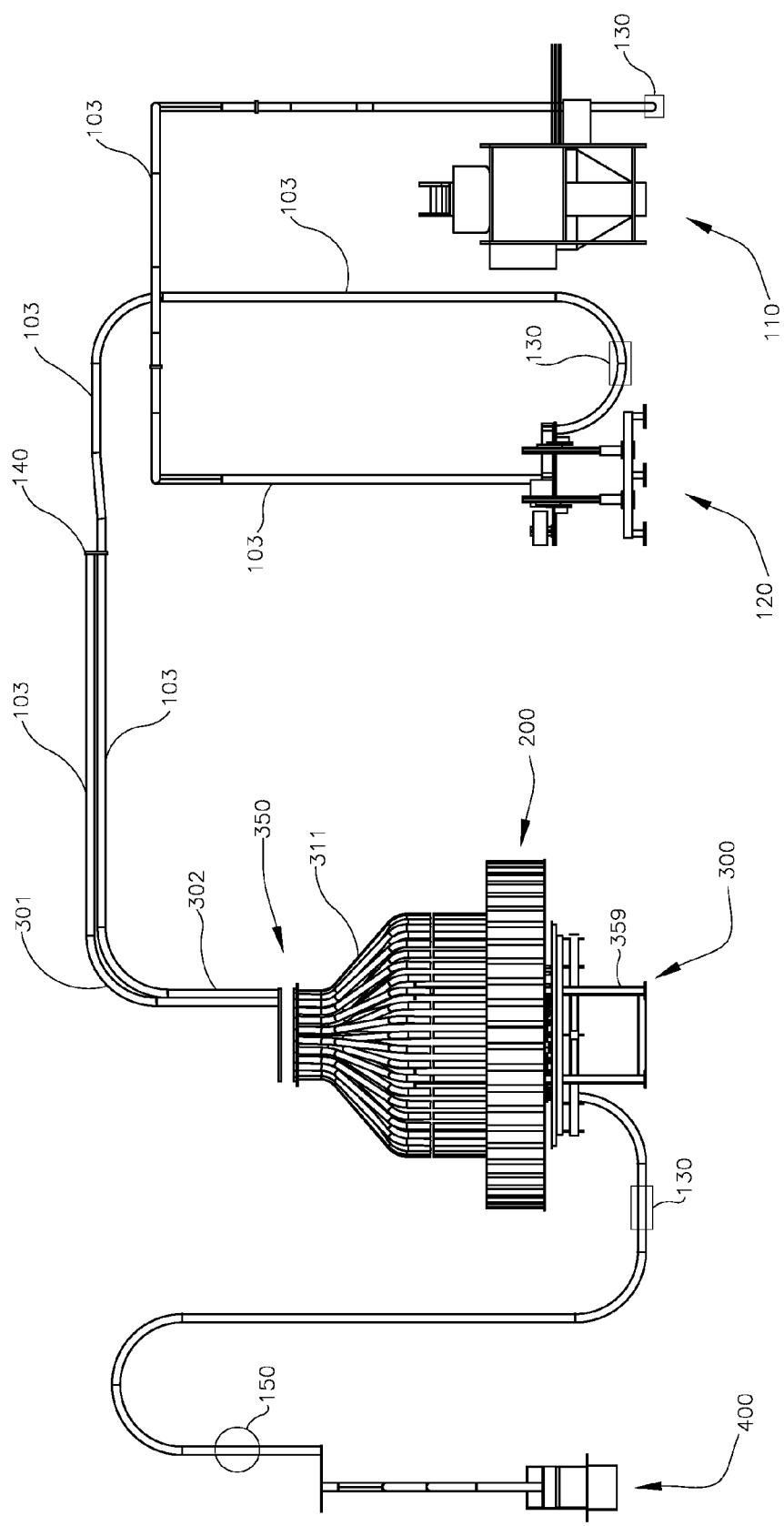
FIG. 3 shows in side elevational view one channel of the bottle transport system FIG. 1.

Referring now to the figures, and particularly to FIGS. 1-3, automated prescription filling system 1000 comprises prescription dispensing apparatus 300 feeding filled prescription bottles 10 (see FIG. 4) through prescription verification stage 400 and sortation conveyor system 500 to bagging, packaging and shipping system 600 where filled prescriptions are conveyed through common carriers to pharmacies, hospitals and individual patients (collectively "customers"). Apparatus 300 comprises a stage where containers 10 are filled according to each individual prescription from an array of individual pharmaceutical dispensing machines 200 and sealed by automated capping system 160. Containers 10 then are transported to verification stage 400 where a pharmacist confirms that each container 10 contains the pharmaceutical required, then to conveyor 500 where it is accumulated with other containers 10 for the same customer before being packaged at stage 600 and shipped, all without requiring human hands to handle containers 10 or their pharmaceutical contents.

Pharmaceutical dispensing machines 200, prescription dispensing apparatus 300, prescription verification system 400, sortation conveyor system 500, container 10 and prescription autopackaging system 600 all are the subject matter of related but separate patent applications. This application is for container transport system 100 which couples together the various stages of system 1000 and which may be used independently for other such systems or purposes.

NOTE: hereinafter, the present invention is discussed in the context of a preferred embodiment utilizing prescription bottles, but one having ordinary skill in the art will recognize that other types of containers having similar features may be substituted and still considered to be within the spirit and scope of the present invention.

Prescription Bottle

Figure 4:
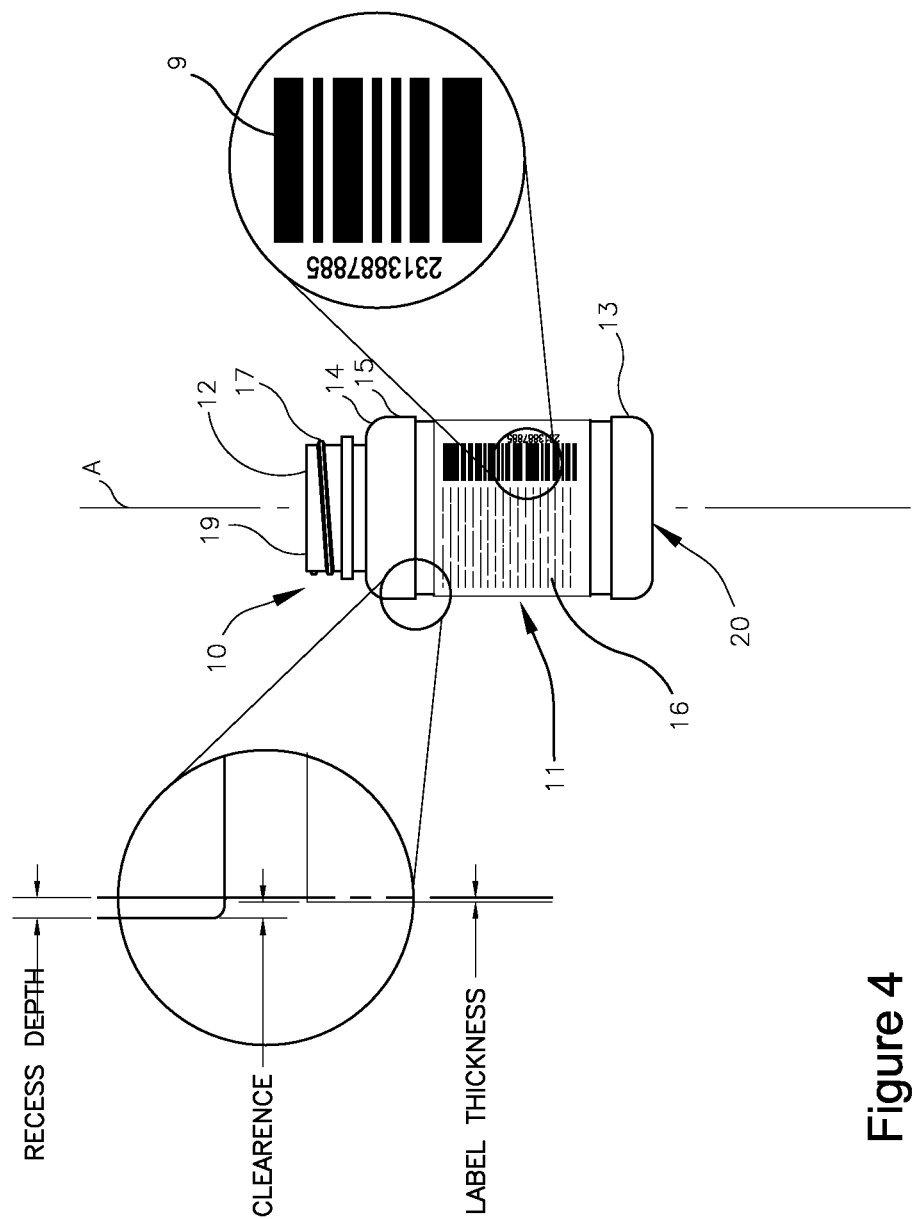
FIG. 4 details a bottle used in the bottle transport system of FIG. 1.

Turning now also to FIG. 4, container 10 comprises a bottle having regular, circular, cylindrical walls 11 surrounding and concentric about longitudinal axis A and defining interior 12. Other than at ridges, or rings 15, bottle 10's diameter remains substantially uniform along axis A between bottom 20 and shoulders 14, where it reduces to neck 17 bearing threads 18 adapted to mate with a cylindrical cap (not shown) which closes and seals bottle 10. Though larger than neck 17, the cap's diameter remains slightly smaller than that of walls 11 to remain within the cylindrical profile of bottle 10.

Disposed between shoulders 14 and bottom 20, annular recess 13 slightly reduces the outside diameter of bottle 10 between upper and lower rings 15 to accommodate label 2. Label 2 bears indicia 9 comprising a bar code or other machine readable encoding adapted to inform prescription filling system 1000 and its various sensors and software (not shown), through use of a dynamically populated database, of the contents and expected location of bottle 10 within prescription filling system 1000. Recess 13 offsets label 2 from the full diameter of bottle 10, leaving only annular rings 15 adjacent bottom 20 and shoulder 14 to contact tubing 101 (FIG. 1). This prevents label 2 from becoming scuffed, torn, abraded or smeared, and from sliding out of place, while bottle 10 speeds through system 1000 and is abruptly stopped, rotated, translated and otherwise jostled.

Bottles 10 preferably are made from high-impact polypropylene fabricated using an injection molding a process. One having ordinary skill in the art will recognize, however, that other materials may be suitable for bottles 10 as long as they maintain dimensional stability and remain relatively light in weight so that their mass is comparatively nominal in contrast to the mass of their contents.

For containers 10 described herein with the preferred embodiment, bottles 10 have an outside diameter of two (2") inches and are approximately four (4") inches long, including their caps installed onto neck 17 and mated with threads 18. One having ordinary skill in the art will recognize that bottles 10 could be considerably larger or smaller as required in an alternate embodiment or application.

Bottle Induction and Labeling

Figure 5:
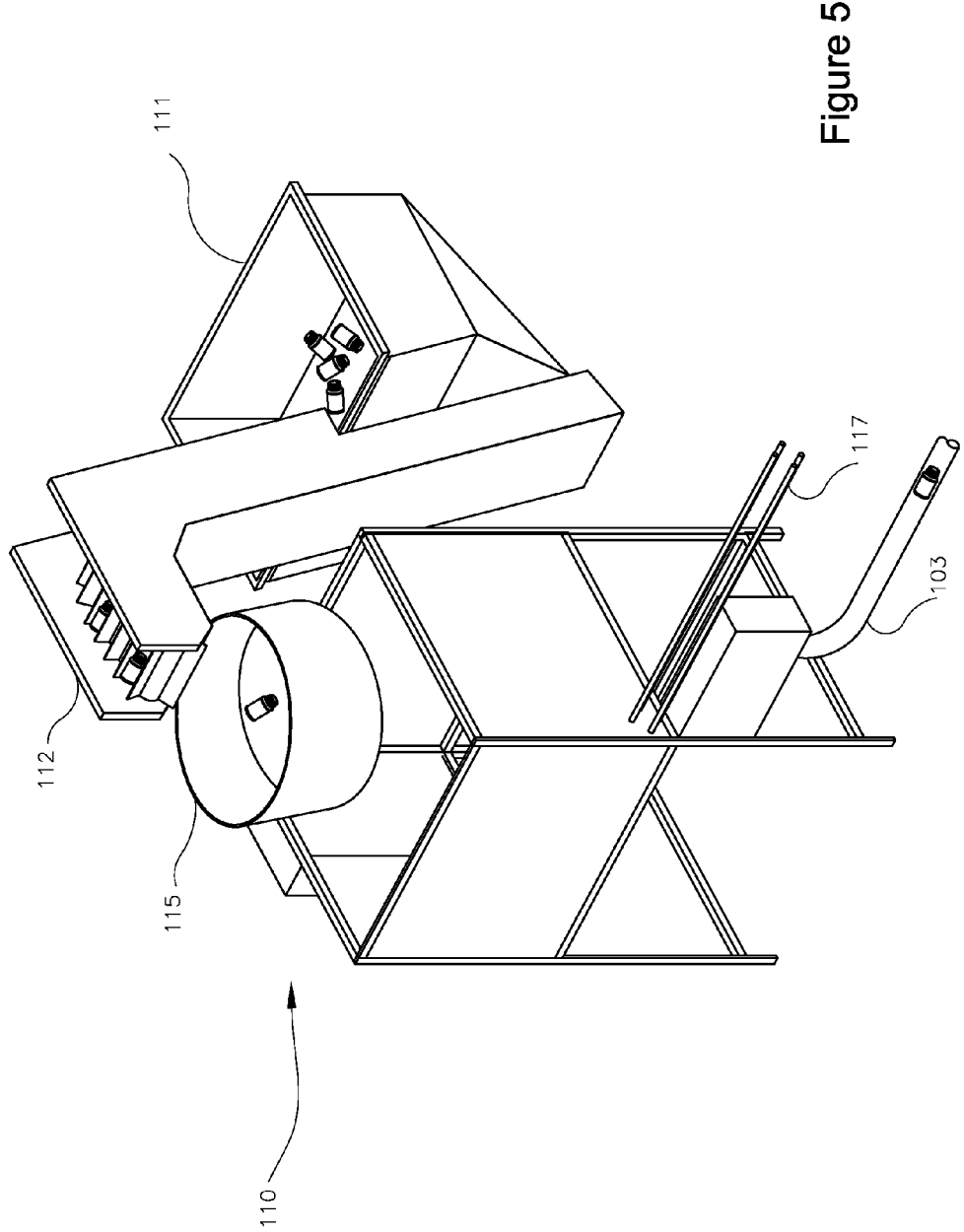
FIG. 5 shows in quartering perspective view a bulk bottle unscrambling device used in the automated prescription system of FIG. 1.
Figure 6:
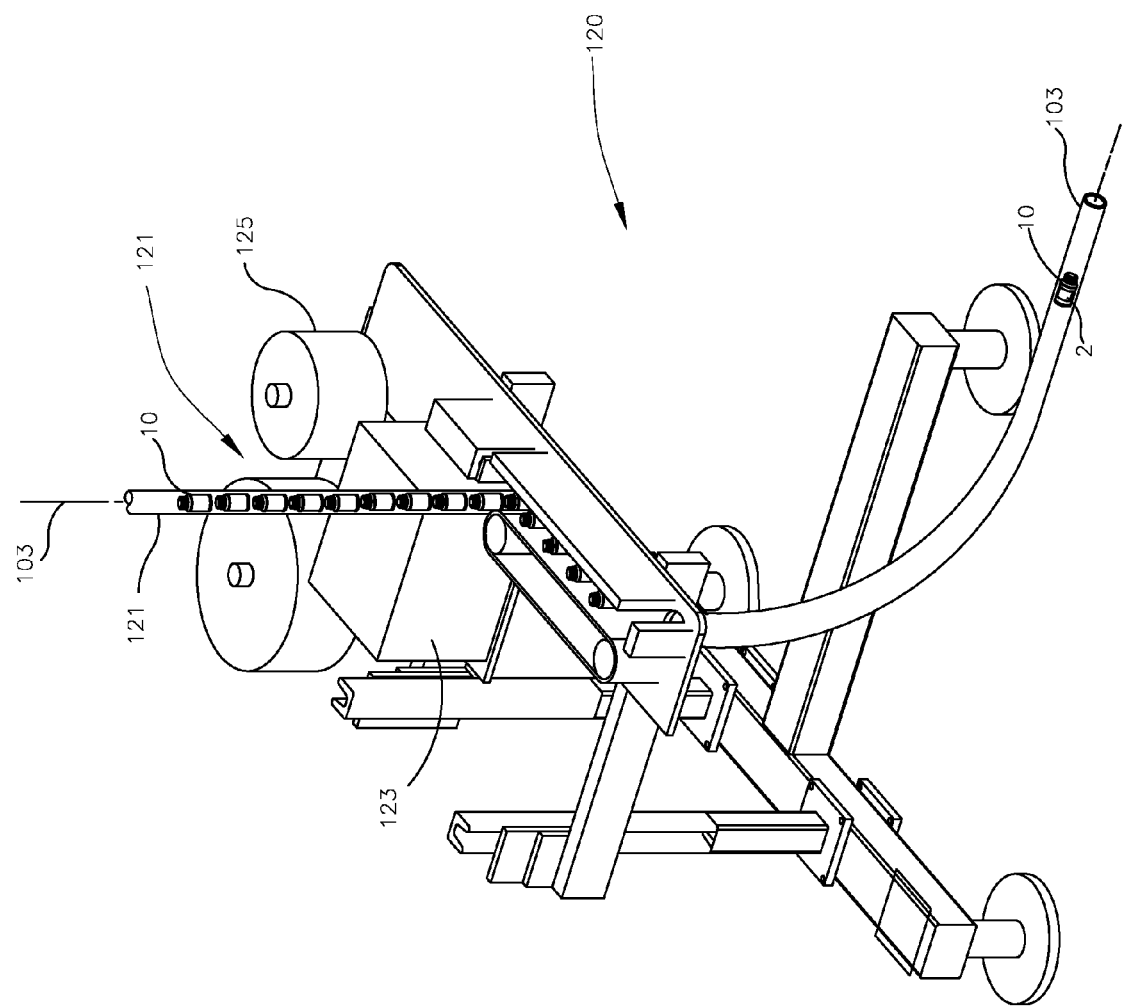
FIG. 6 shows in quartering perspective view a bottle labeling device used in the automated prescription system of FIG. 1.
Figure 7E:
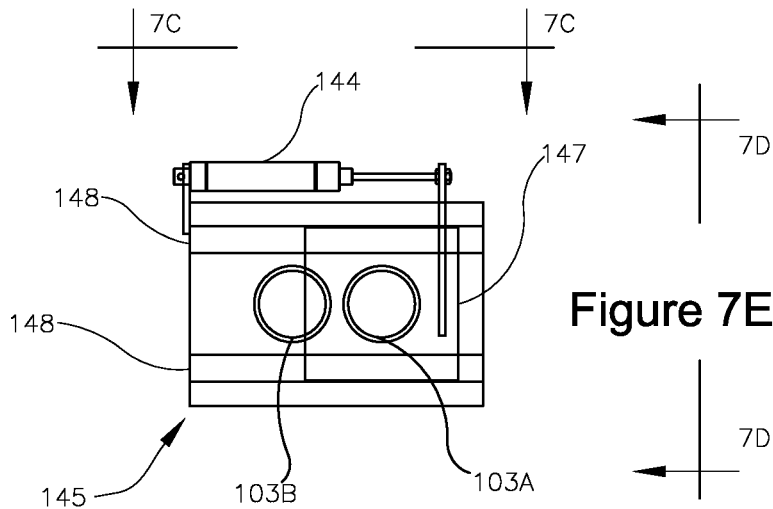
Figure 7D:
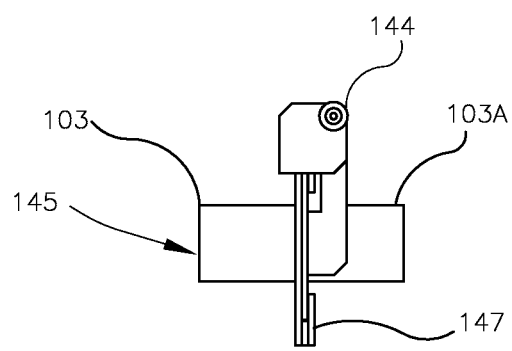
Figure 7C:
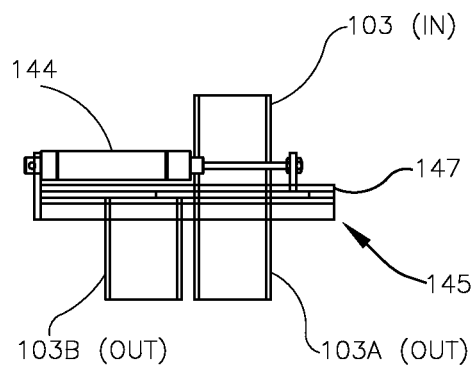

Referring now also to FIGS. 5 and 6, it will be understood that bottles 10 enter system 1000 uncapped, and that caps must be placed on bottles 10 after they have been filled by dispensers 200 within stage 300.

Bottles 10 are manufactured separately to the specifications discussed above and provided in bulk to system 1000. It will also be understood that bottles 10 so provided will be oriented at random, or "scrambled" within their shipping containers. It will further be understood that such a state of arrangement cannot be tolerated within system 1000 which requires consistent orientation and organization of bottles 10. Accordingly, FIG. 5 depicts a bottle "unscrambler" 110 having hopper 111 into which bulk bottles 10 are introduced in batch. Conveyor 112 picks up bottles 10 from hopper 111 with their longitudinal axes 1 parallel, but with their bottoms 20 disposed randomly in one direction or the other. Conveyor 112 transfers bottles 10 into centrifuge 115 so arrayed that centrifuge 115 reorients bottoms 20 all in one direction, directed downward toward tube 103 at exit 117. Bottles 10 then enter tube 103 bottom 20 first and proceed to labeling machines 120 where labels 2 are applied. Unscrambler 110 typically is available commercially in various sizes according to the size and shape of bottles 10.

FIG. 6 shows printer and labeler 120 in which each bottle 10 arriving from unscrambler 130 receives label 2. Labeler 120 receives bottles 10 one at a time from accumulation stack 121, then rotates them while printing and applying label 2, and sends them on to pharmaceutical dispensing system 300 for filling. As labels 2 carry indicia of the content and quantity of the pharmaceutical to be dispensed, once bottles 10 receive label 2, prescription filling system 1000 tracks the prescription for said customer by following the location and status of each bottle 10. Labeler 120 is available commercially and capable of imprinting and labeling bottles 10 of various sizes and shapes, as required by the application.

Diverter Gates

As bottles 10 move along tubing 103 between stations in system 1000, software tracks them by their indicia on labels 2 to assure they arrive at the proper location for filing (stage 300), verification (stage 400), sortation and accumulation with other bottles 10 for the same customer (stage 500) and bagging and shipping (stage 600). Each stage requires a finite amount of time to perform its function for each bottle 10, and system 1000 comprises an appropriate number of each stage device so that system 1000 may induce a consistent, reliable and optimized throughput of bottles 10 filled with pharmaceuticals. Accordingly, as depicted in the figures, system 1000 utilizes four dispensing stages 300, each fed by two labelers 120, for a total of eight (8). By contrast, labelers 120 may be served by as few as two (2) bulk bottle unscramblers 110. Obviously, then, for two unscramblers 110 to feed eight labelers 120, a gating system within tubes 103 must be employed to divert bottles 10 between stages and to direct them to the devices awaiting additional bottles 10.

Referring now to FIGS. 7A-9, two way (FIGS. 7A-7F) and three-way (FIGS. 8A-8D) diverters 140 direct bottles 10 entering from incoming tube 103 into two or three alternative outgoing tubes 103. Each diverter 140 comprises substantially planar gate 145, 146 having door 147 slidably received within track 148 and coupled to one or two slide actuators 144. Door 147 remains coupled to incoming tube 103 and moves it into axial alignment with outgoing tubes 103A-103E in response to actuators 144 under the control of system 1000. Gates 145, 146 are adapted to articulate between outgoing tubes 103A, 103B (for two-way gate 145) and 103C, 103D, 103E (for three-way gate 146) to direct bottle 10 to one or the other of alternate tube 103 pathways. Suitable actuators 144 are available commercially from SMAC, Inc. of Carlsbad, Calif. (internet address: www.smac-mca.com).

Figure 8A:
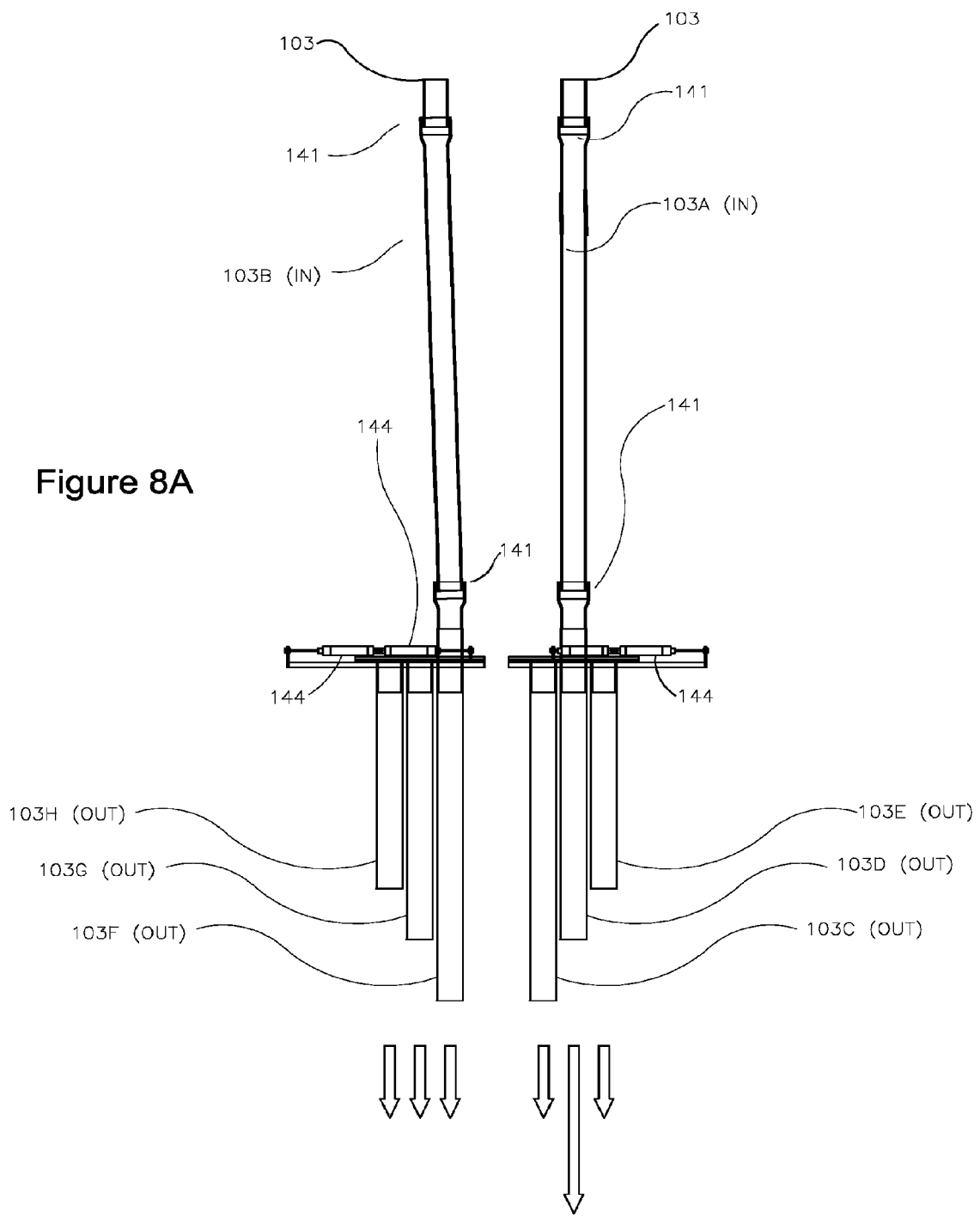
Figure 8D:
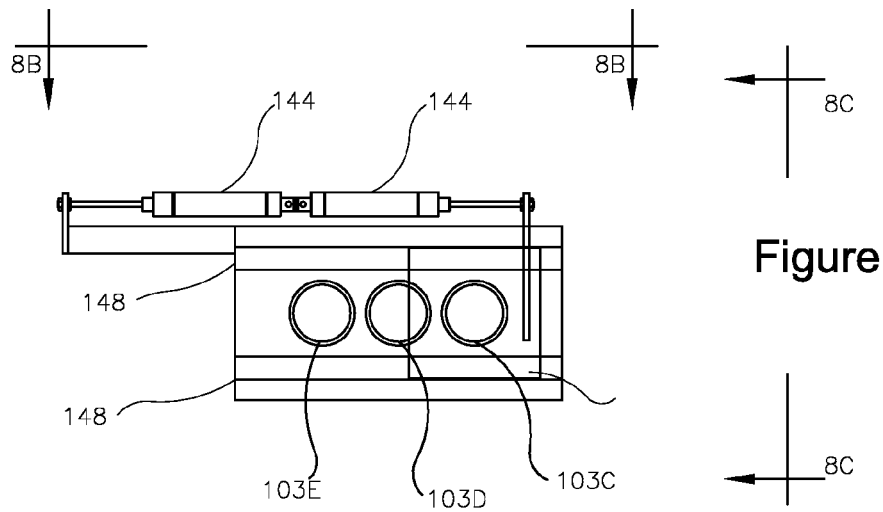
Figure 8B:
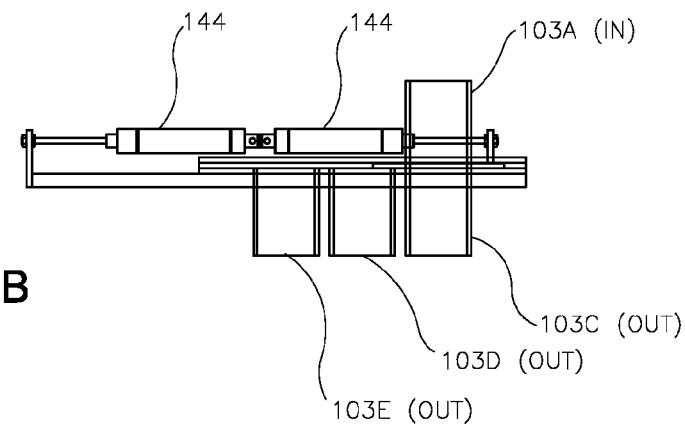
Figure 8C:
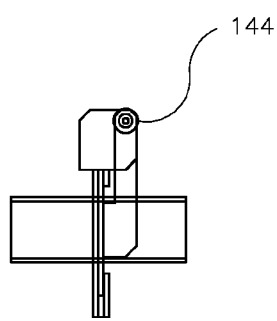

Given that tubing 103 is relatively rigid, elbows 141 disposed on either end of a short section of tube 103 permit gates 145, 146 to oscillate joint 103J, a short section of tube 103, into one of two positions. Joint 103J includes elbow 141 having flared end 142 adapted to surround and receive gasket 143 disposed on the outside of incoming tube 103. Being of pliable material, gasket 143 allows bell end 142 of joint 103J to move within a small angle of freedom sufficient for gate 145 to articulate between Position 1 and Position 2 (see FIG. 7A). A second elbow 141 at gate 145, 146 allows tube 103 coupled to door 147 to remain aligned with one or the other of outgoing tubes 103A, 103B (FIG. 7A for two way gate 145) or outgoing tubes 103C, 103D, 103E at three-way gate 146 (FIG. 8A). Preferably, bell end 142 has an inside diameter one-fourth (¼") larger than the outside diameter of tube 103, the gap being filled by gasket 143. A suitable material for gasket 143 is high-density, closed cell, foam rubber, formed into an annular ring one-eighth (⅛") inch thick and one (1") inch wide.

Figure 9:
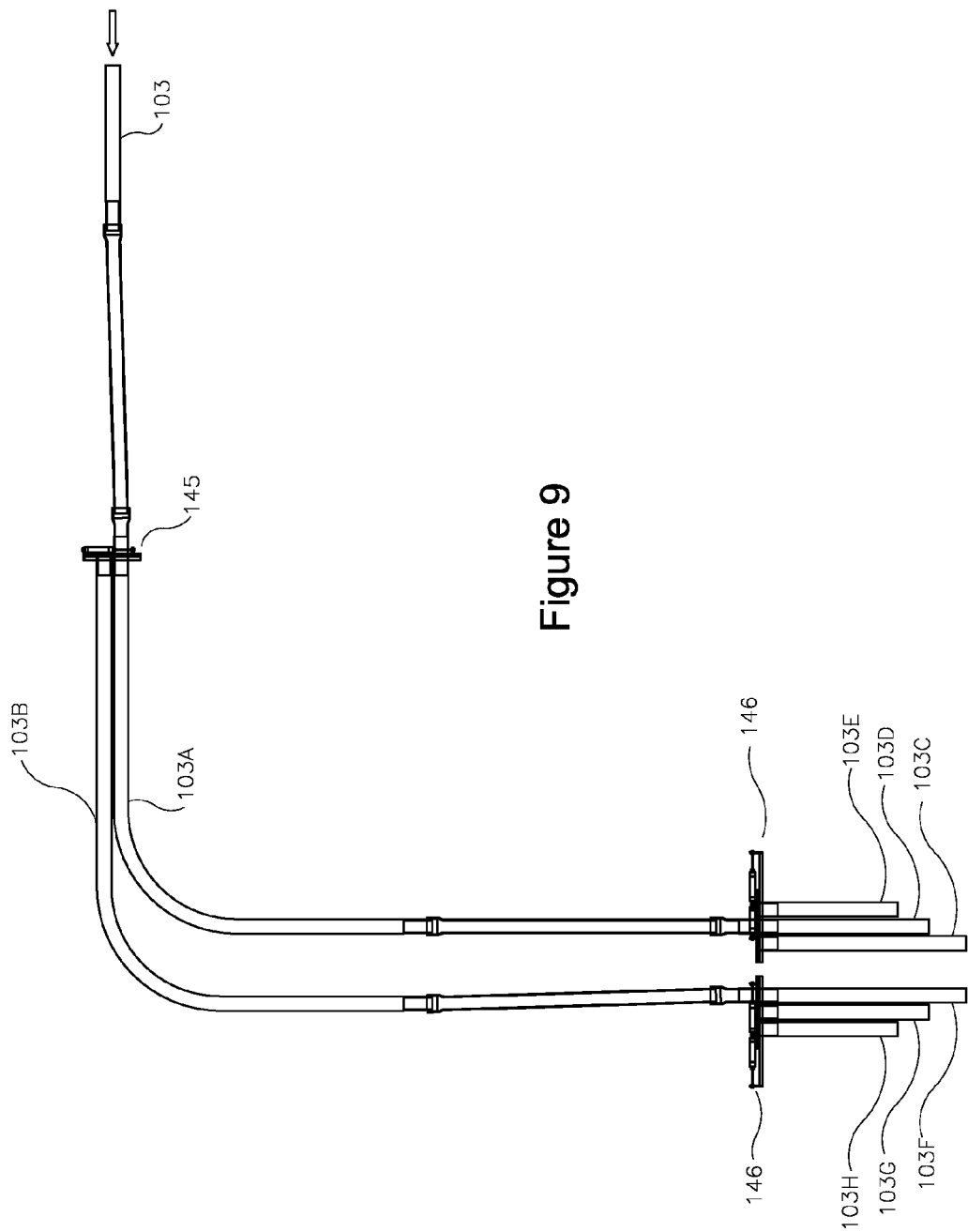
FIG. 9 shows diverter valves of FIGS. 8A-9D directing a bottle into alternate paths.

Referring now to FIG. 9, one can see that cascading gates 145, 146 can divert bottle 10 traveling within incoming tube 103 into one of six different routes within system 1000 represented by alternate outgoing tubes 103C-103H. Bottle 10 enters two-way gate 145 and is diverted either of outgoing tubes 103A, 103B, each of which feeds into one of two three-way gates 146, each of which has three outgoing tubes 103C-103H.

As is best recognized from FIG. 9, each gate configuration must remain open (i.e. in its position when bottle 10 passes through it) until bottle 10 reaches its destination. This is due to the fact that air 101 traveling with bottle 10 from incoming tube 103 must continue to propel bottle 10 to its destination past gates 145, 146. To do so, the pathway through gates 145, 146 must remain open so air 101 can flow behind bottle 10. If either of gates 145, 146 were operated by system 1000 to move door 147 to another position, such action would interrupt air 101 flowing with bottle 10 and thereby stop it at a position where its momentum became dispelled, possibly before it reached its destination at the next stage. To this end, then, sensors (not shown) positioned at inputs to each stage scan indicia on label 2 of each bottle and report to system 1000 when bottle 10 has arrived, permitting system 1000 to route another bottle 10 through gates 145, 146 to whichever destination that other bottle 10 may be bound (downstream through one of tubes 103C-103H).

Tubing and Impellers

Figure 10A:
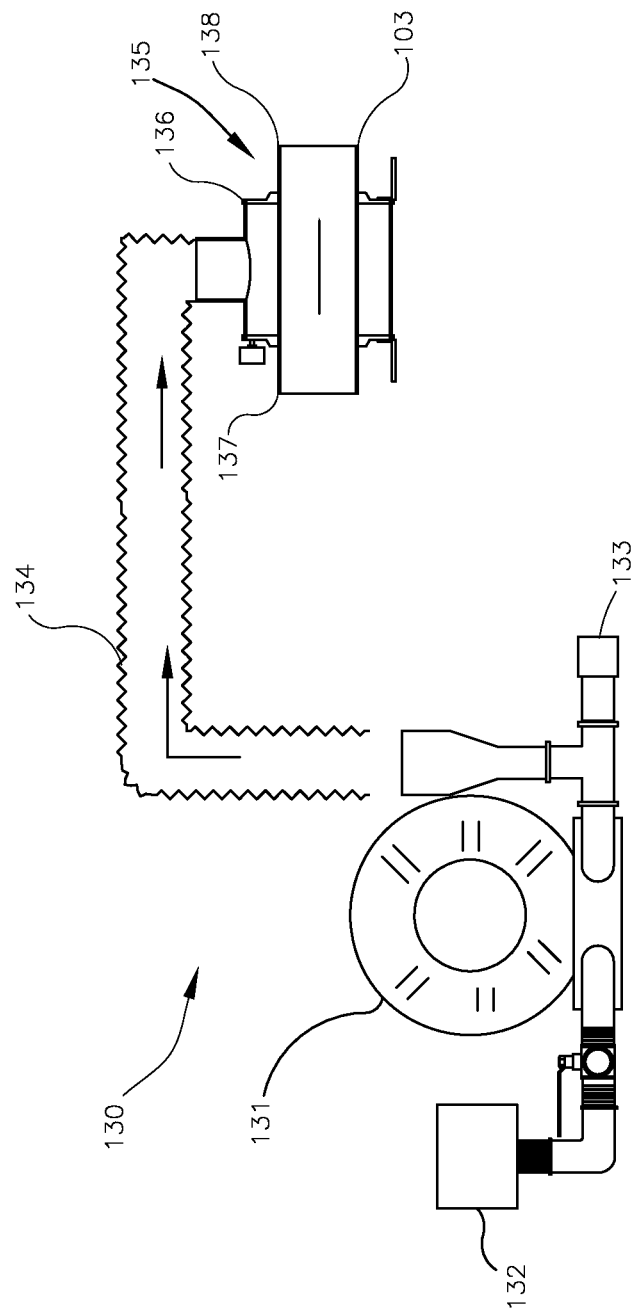
FIGS. 10A-10B detail an air impeller employed in the bottle transport system of FIG. 1.
Figure 10B:
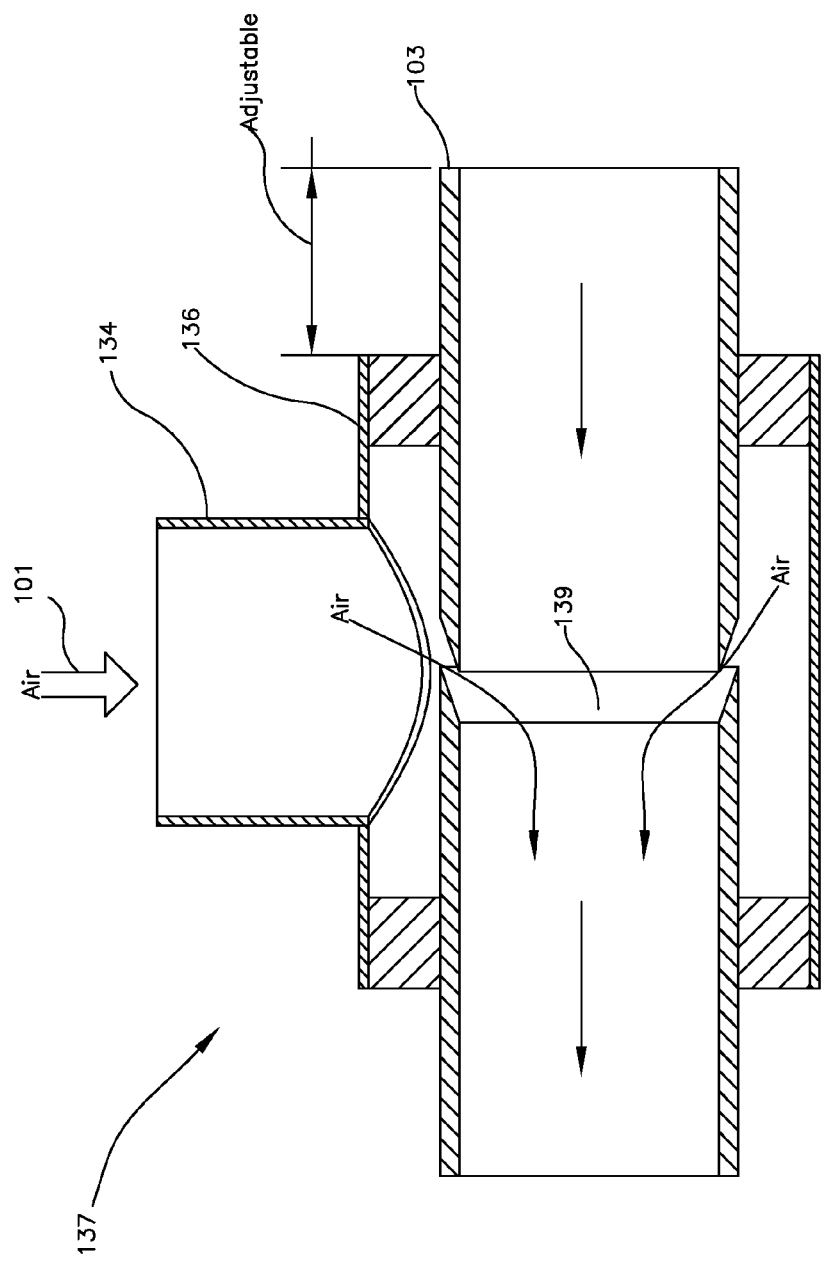

Turning now also to FIGS. 10A, 10B, bottles 10 move through tubes 103 between stations of system 1000. Tubes 103 comprise regular, cylindrical conduits having an inside diameter adapted to provide sufficient room inside for container 10 while sufficiently restricting it so that container 10 can be propelled reliably and quickly. For bottles 10 described in the preferred embodiment, tubes 103 preferably have an inside diameter of two and one-half (2½") inches. Thus, bottles 10 moving through tubes 103 have approximately a one-eighth (⅛") clearance between the inside diameter of tubes 103 and rings 15 of walls 11 of bottles 10. One having ordinary skill in the art will recognize that tube 103 inside diameter will depend upon the size and shape of container 10, perhaps requiring more or less clearance than specified herein for the preferred embodiment.

For example, caps for bottles 10 travel through capper system 160 (FIGS. 1, 2) in tubes 162 having an inside diameter of four and three-quarters (4¾") inches, despite the fact that the caps are cylinders with an outside diameter no greater than rings 15 of bottles 10, and preferably slightly smaller. The large inside diameter is required, however, because the caps are very short tumble rather than remaining oriented uniformly. Thus, more clearance is required to prevent them from becoming lodged in tubes 162.

Preferably, tubes 103 are transparent or translucent to permit visual monitoring of bottles 10 as they move through tubes 103. Tubes 103 should be impact resistant and dimensionally stable, especially in cross section, and should remain straight through substantial lengths of horizontal runs. A suitable material for tubes 103 is high-impact plastic such as cross-linked polyethylene or high-impact polystyrene, having a wall thickness of at least Schedule 40, and preferably Schedule 80. One having ordinary skill in the art will recognize that other suitable materials, such as glass, aluminum or steel, could be used for tubes 103 without departing form the spirit and scope of the present invention.

Bottles 10 move through tubes 103 due to the action of impellers 130. Each impeller 130 comprises blower 131 coupled through pipe tee 133 and hose 134 to venturi chamber 135 where air 101 is introduced into tube 103. As best seen in FIG. 10B, venturi chamber 136 surrounds tube 103 at beveled gap 139, thereby preventing air 101 from escaping and forcing it into tube 103. Because of the shape of gap 139, air 101 is forced to enter tube 103 and travel in a predicted direction rather than simply elevate the overall pressure in tube 103. Thus, air 101 introduced from blower 131 is directed downstream (see arrows) from venturi 135 while drawing air from tube 103 entering the upstream end of chamber 136. Gap 139 may be adjusted (FIG. 10B) to increase or decrease the velocity of air 101 without regulating the speed of blower 131. A suitable venturi 135 is available commercially as "M-300 Air-Tran" from Air-Tran Company, Inc., of Canton, Ga.

As best seen in FIG. 3, impellers 130 are employed in system 1000 at the beginning of each run of tubing 103 as it leaves a station. For example, one impeller 130 is located just downstream from each labeler 120 to propel bottles 10 from labeler 120 to bottle filling stage 300, and another on output tube 103 from bottle filling stage 300 to verification stage 400. One having ordinary skill in the art will recognize that FIG. 3 is schematic in nature, and that the length of tubes 103 varies not only in distance but also in elevation change, and the particular selected number of holes, size of gap 139 and even the speed at which blower 131 operates, will be determined upon installation and operation of system 1000.

To control air 101 velocity and pressure within tube 103, a plurality of holes (not shown) may be introduced into the walls of tube 103 downstream of venturi 135. The more holes employed, the more slowly air 101 and bottle 10 move between venturi 135 and the next open location of tube 103 (e.g. where bottle 10 exits tube 103). In such fashion, the speed at which bottles 10 arrive at the next station may be tuned to coordinate arrival time and impact at bottle 10's destination. One having ordinary skill in the art will recognize that the desired speed and pressure of air 101 depends upon how far bottle 10 must travel through tube 103 from impeller 130 to its next stage destination, and its mass. When bottle 10 is empty, it takes relatively little energy to move it through tube 103, and such energy is consistent from one bottle 10 to the next. When bottle 10 is filled, however, its mass increases substantially, depending upon how full bottle 10 is and what pharmaceutical fills it. When filled with a prescription, then, bottle 10 has more inertia, requires greater energy from air 101 to move it and stores more kinetic energy and momentum once moving.

Decelerators

Once bottle 10 arrives at its destination at the end of a run of tube 103, it must be halted so that it may be attended to by the stage at which it has arrived. As mentioned above, when bottle 10 has been filled with pharmaceutical, it has considerably more mass, and stores more kinetic energy in movement, than when empty. Further, as also mentioned above, its contents must be protected from undue shock, abrasion and damage due to subsequent movement of bottle 10.

FIGS. 11A-11B and 12A-12B reveal two types of bottle decelerators which provide means for stopping bottles 10 as they reach their destination (at the next stage). Representing plan views (FIGS. 11B, 12B) and side elevation views (FIGS. 11A, 12A) respectively, decelerators 150A, 150B each comprise a plurality of yokes 151 surrounding and positioning four vanes 152 such that their inside edges engage bottles 10 as they travel through decelerators 150A, 150B and exit through chute 155. Held in such relative juxtaposition by yokes 151, vanes 152 replace tubes 103 as the pathway for bottles 10. Vanes 152 are open to the atmosphere so that moving air 101 from tube 103 is expelled, removing its impetus to bottle 10. Vanes 152 also sweep in unison through decelerating curves 156 to slow bottles 10 by absorbing kinetic energy stored in bottles 10 as they are forced around curves 156. After passing through curves 156 and losing a pre-determined quantum of kinetic energy, bottles 10 then arrive at conveyor belt 153, driven at a set speed by motor 154, where they further are slowed to a predetermined pace defined by the movement of conveyor 153. A plurality of bottles 10 may accumulate on conveyor 153 until needed by the next stage of system 1000, whereupon they are dropped through chute 155.

Figures 11A, 11B:
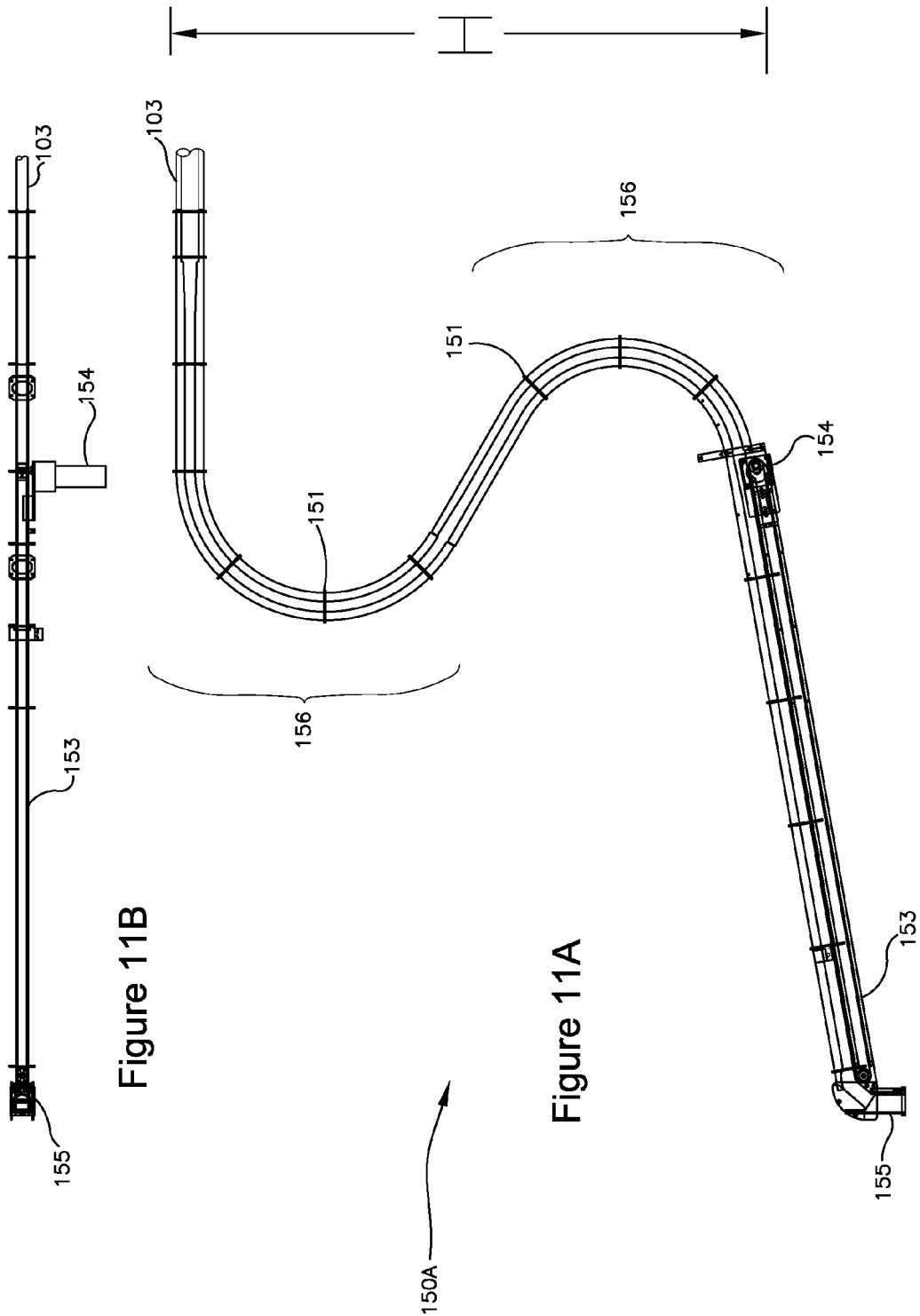
Figure 12B:
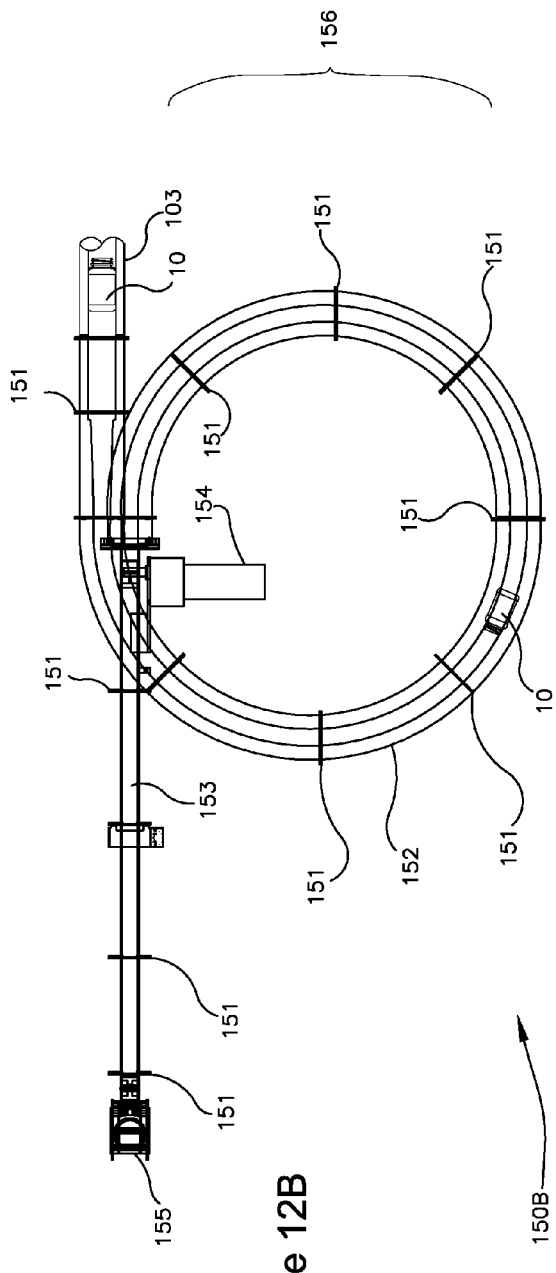
Figure 12A:
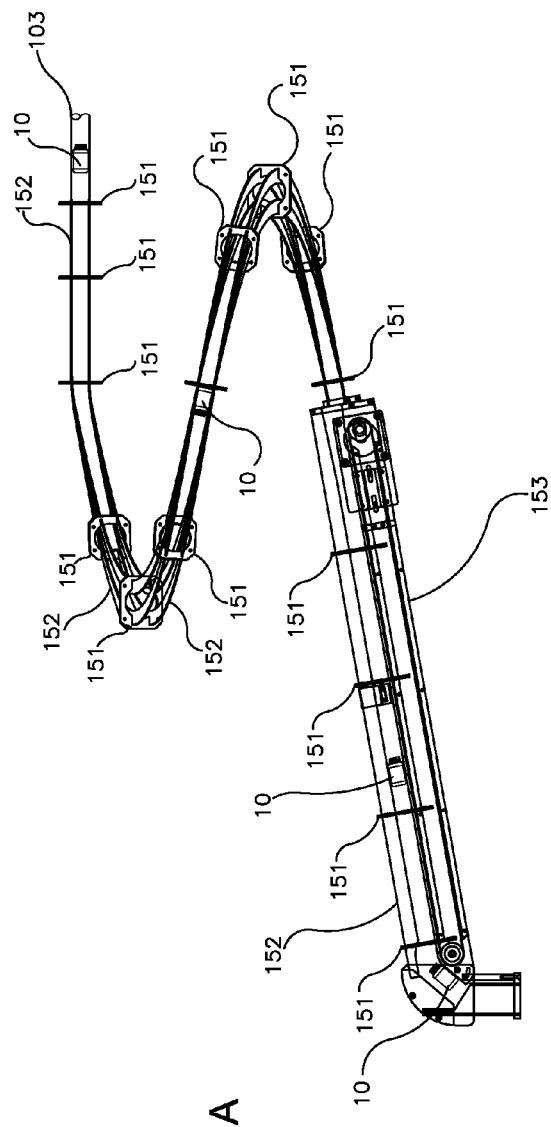

The choice between the two types of decelerators 150A, 150B, and the dimensions of them, is determined from the speed and mass of bottles 10 as they approach the stage where decelerators 150 are located. One having ordinary skill in the art will recognize that curves 156 differ between decelerators 150. As depicted in FIGS. 11A, 11B, vanes 152 of decelerator 150A sweep through two curves 156 having a cumulative total angular redirection slightly less than one hundred eighty (180) degrees before bottles 10 land on conveyor 153. Further, curves 156 of decelerator 150A may be oriented vertically or horizontally. When decelerator 150A is vertical, gravity acting through height H continues to contribute to the speed of bottles 10 even though bottles 10 slow down due to loss of kinetic energy into vanes 152. The buffering effect upon the speed of bottles 10 as they pass through decelerator 150A also may be increased by either lengthening the radius of curves 156 or by adding more curves 156. One having ordinary skill in the art will recognize that the combination of the number and length curves 156 and the orientation (vertical vs. horizontal) of decelerator 150A is determined as needed, and that these elements are tools for designing a decelerator 150 appropriate for the circumstances.

By contrast to decelerator 150A, vanes 152 of decelerator 150B sweep substantially horizontally and through a helical path of at least a portion of an entire three hundred sixty (360) degree path before depositing bottles 10 onto conveyor 153, thus dissipating kinetic energy of bottles 10 in a much lower vertical displacement H than decelerator 150A. Further, height H of decelerator 150B may be reduced as needed to attenuate the effect of gravity on bottles 10 without much effect on the shape of curves 156. For example, to enhance the effect of decelerator 150B, and thereby absorb more kinetic energy, height H may be reduced to almost zero, limited only by the requirement that vanes 152 remain able to pass beneath themselves upon traversing a full 360 degrees. Such arrangement substantially eliminates the effect of gravity on the momentum of bottles 10 while requiring decelerator 150B to occupy the same horizontal space. Retarding the buffering effect of decelerator 150B, by allowing gravity to contribute more to bottle 10's momentum, merely requires increasing height H.

One having ordinary skill in the art will recognize, too, that decelerator 150B need only be adjusted by its mounting brackets (not shown) to effect the above adjustments, and the vanes 152 are amply flexible and resilient to allow such adjustments without modification. This is in contrast to decelerator 150A which must be modified by lengthening or shortening vanes 152, and rearranging the orientation of curves 156, to adjust its buffering effect. Of course, decelerator 150B also could be adjusted by lengthening or shortening vanes 152 and causing them to sweep through more or less than 360 degrees of path for bottles 10.

The choice of which decelerator 150A or 150B also depends upon the geometry of system 1000 near the stage at which filled prescription bottle 10 arrives. Where vertical space is limited, and horizontal space is available, decelerator 150B may be preferred. Where horizontal space is at a premium but vertical space allows, decelerator 150A may be appropriate. Preferably, vertical "S" decelerator 150A employs curves 156 having a radius of one to two (1'-2'), while horizontal, spiral decelerator 150B employs curves 156 having a radius of two or more feet, enabling spiral decelerator 150B to absorb more kinetic energy than S-decelerator 150A Returning now again to FIGS. 1-3, bottle transport system 100 of the present invention couples multiple stages 200, 300, 400, 500, 600 together to shepherd containers 10 from arrival in bulk at unscrambler 110 all the way to shipping 600 to each customer after being filled with the prescribed amount of pharmaceutical. Air impellers 140 stationed at the output of each stage urge containers 10 through tubes 103 without the need for pucks or totes to shepherd containers 10 through system 1000. Diverter gates 145, 146 permit transport system 100 to optimize the number of runs of tubes 103 to reflect throughput of prescriptions from the number of prescription filling devices at stage 300 being employed. Once containers 10 are filled at stage 300, decelerators 150 may be employed at the ends of subsequent tube 103 runs to cushion the arrival of containers 10 and to protect them and their contents.

While the invention has been particularly shown and described with reference to preferred and alternate embodiments, it will be understood by those skilled in the art that various changes in form and detail may be made therein without departing from the spirit and scope of the invention.

For example, though containers transport system 100 has been presented herein in the context of prescription filling for pharmaceuticals, it easily could be adapted to any inventory management system dispensing containers of small objects, such as screws, nuts or other fasteners. Container 10 has been described as a bottle having dimensions appropriate to the preferred embodiment of a pharmaceutical prescription-filling application, but it could be considerably larger or smaller as required, either in similar pharmaceutical prescription filling systems or in other applications.

I claim:

1. A container decelerator apparatus for slowing containers impelled through a container transport system between at least two container processing stations, the container transport system having pneumatic conduits through which the containers are impelled by low pressure, high speed air, the containers each having a body having a diameter sized to be slidably received within said pneumatic conduits and surrounding and enclosing an interior accessible through a sealable container opening, the decelerator comprising:
    an input chute coupled to an exit end of said pneumatic conduit;
    an output chute coupled to a downstream one of said at least two container processing stations;
    a plurality of elongate vanes, each vane having an inner edge and an outer edge and coupled in a curvilinear path between said input chute and said output chute; and
    a plurality of annular yokes disposed along and transverse to said plurality of elongate vanes, said annular yokes engaging said outer edges to hold said elongate vanes in fixed, parallel relation to each other along said curvilinear path.

2. The container decelerator apparatus according to claim 1 wherein the curvilinear path of the elongate vanes comprises:
    a descending helix having
        a horizontal decelerator diameter; and
        a decelerator height defined by a vertical elevation differential between said input and output chutes
    wherein said containers follow a substantially helical path in a single rotational direction through the container decelerator.

3. The container decelerator apparatus according to claim 2 wherein:
    said vertical elevation differential is adjustable; and
    said container decelerator may be adjusted to
        lower a rate of deceleration of said containers by increasing said vertical elevation differential; and
        increase a rate of deceleration of said containers by decreasing said vertical elevation differential.

4. The container decelerator apparatus according to claim 2 wherein:
    said horizontal decelerator diameter is adjustable; and
    said container decelerator may be adjusted to
        lower a rate of deceleration of said containers by decreasing said horizontal decelerator diameter; and
        increase a rate of deceleration of said containers by increasing said horizontal decelerator diameter.

5. The container decelerator apparatus according to claim 2 wherein:
    said horizontal decelerator diameter is adjustable;
    said vertical elevation differential is adjustable; and
    said container decelerator may be adjusted to lower a rate of deceleration of said containers by a combination of decreasing said horizontal decelerator diameter; and by increasing said vertical elevation differential; and
    said container decelerator may adjusted to increase a rate of deceleration of said containers by a combination of increasing said horizontal decelerator diameter; and decreasing said vertical elevation differential.

6. The container decelerator apparatus according to claim 1 wherein the curvilinear path of the elongate vanes comprises:
    a plurality of sequentially disposed, angular re-directional curves, each angular re-directional curve having
        an upstream entrance coupled to said input chute; and
        a downstream exit coupled through a sequentially next angular re-directional curve to said output chute;
    wherein said containers change directions twice through each of said plurality of angular re-directional curves as they move through said container decelerator apparatus, frictionally engaging said inside edges of said elongate vanes with each direction change to dissipate kinetic energy of said containers into said elongate vanes.

7. The container decelerator apparatus according to claim 6 wherein:
    said input chute is disposed at substantially the same vertical elevation as said output chute to
    reduce the vertical displacement of said input chute and said output chute; and
    minimize the acceleration effect of gravity on said containers as they move through said container decelerator apparatus.

8. The container decelerator apparatus according to claim 6 wherein:
    said input chute is disposed substantially above said output chute to minimize the horizontal space occupied by said container decelerator apparatus.

9. The container decelerator apparatus according to claim 1 and further comprising:
    a container conveyor coupled between said output chute and said at least two container processing stations, the container conveyor having
        a container support belt adapted to rotate around a least two pulleys to move a plurality of containers exiting from said output chute; and
        a motor coupled to one of said at least two pulleys and adapted to rotate the container support belt at a speed selected to urge said containers into said downstream one of said at least two container processing stations at a pace adapted to coordinate with a container processing speed of said downstream one of said at least two container processing stations.

10. A container decelerator apparatus for slowing containers impelled through a container transport system between at least two container processing stations, the container transport system having pneumatic conduits through which the containers are impelled by low pressure, high speed air, the containers each having a body having a diameter sized to be slidably received within said pneumatic conduits and surrounding and enclosing an interior accessible through a sealable container opening, the decelerator comprising:
    an input chute coupled to an exit end of said pneumatic conduit;
    an output chute coupled to a downstream one of said at least two container processing stations;
    a plurality of elongate vanes, each vane having an inner edge and an outer edge and coupled in a curvilinear path between said input chute and said output chute;
    a plurality of annular yokes disposed along and transverse to said plurality of elongate vanes, said annular yokes engaging said outer edges to hold said elongate vanes in fixed, parallel relation to each other along said curvilinear path; and
    a container conveyor coupled between said output chute and said at least two container processing stations, the container conveyor having a container support belt adapted to rotate around at least two pulleys to move a plurality of containers exiting from said output chute; and a motor coupled to one of said at least two pulleys and adapted to rotate the container support belt at a speed selected to urge said containers into said downstream one of said at least two container processing stations at a pace adapted to coordinate with a container processing speed of said downstream one of said at least two container processing stations.

11. The container decelerator apparatus according to claim 10 wherein:

a vertical displacement between said input chute and said output chute is adjustable to regulate a rate of deceleration of said containers as they move through said container decelerator apparatus.

12. The container decelerator apparatus according to claim 11 wherein:

the elongate vanes are resilient; and the curvilinear path of the elongate vanes comprises a descending helix whereby said vertical displacement is adjusted by stretching said descending helix to cause said resilient elongate vanes to extend through a greater vertical displacement between said input chute and said output chute.

13. The container decelerator apparatus according to claim 11 wherein:

the curvilinear path of the elongate vanes comprises a descending helix having a horizontal helix diameter that is adjustable;

said container decelerator may be adjusted to lower a rate of deceleration of said containers by a combination of decreasing said horizontal helix diameter; and by increasing said vertical displacement; and said container decelerator may be adjusted to increase a rate of deceleration of said containers by a combination of increasing said horizontal decelerator diameter; and decreasing said vertical displacement differential.

14. The container decelerator apparatus according to claim 11 wherein the curvilinear path of the elongate vanes comprises:

a plurality of sequentially coupled, angular re-directional curves, each angular re-directional curve coupled to a next one of said plurality of angular re-directional curves to cause said containers to encounter a pair of direction changes for each of said plurality of angular redirection curves as they move through said container decelerator apparatus, the containers frictionally engaging said inside edges of said elongate vanes with each direction change to dissipate kinetic energy of said containers into said elongate vanes.

15. The container decelerator apparatus according to claim 14 wherein:

said input chute is disposed at substantially the same vertical elevation as said output chute to reduce the vertical displacement of said input chute and said output chute; and minimize the acceleration effect of gravity on said containers as they move through said container deceleration apparatus.

16. The container decelerator apparatus according to claim 14 wherein:

Said input chute is disposed substantially above said output chute to minimize the horizontal space occupied by said container decelerator apparatus.

* * * * *